Patented May 1, 1923.

1,453,764

UNITED STATES PATENT OFFICE.

ALBERT NEUSELLA, OF CHICAGO, ILLINOIS, ASSIGNOR OF ONE-HALF TO ARTHUR A. PATTERSON, OF CHICAGO, ILLINOIS.

LIQUID FOR TREATING FABRICS.

No Drawing.    Application filed January 19, 1922.   Serial No. 530,446.

*To all whom it may concern:*

Be it known that I, ALBERT NEUSELLA, a citizen of the United States, residing at Chicago, in the county of Cook and State of Illinois, have invented a new and useful Improvement in Liquids for Treating Fabrics, of which the following is a specification.

The present invention relates to solutions for the impregnation and coating of fabric materials, and more particularly of such articles as collars, cuffs and the like, and will be more fully understood from the following description thereof.

The impregnating and coating material prepared in accordance with the present invention, may be applied to articles of fabric materials, such as collars, and as a result of its application, the fabric material is rendered substantially impervious to moisture, perspiration, grease and the like, without substantially affecting its appearance. The treating material is particularly distinguished in that it does not impart a gloss to the articles treated. In its preferred embodiment, the treating material is not highly combustible, although the use of more readily combustible materials is within the range of the present invention.

In preparing a treating solution in accordance with the present invention, a soluble cellulose product, such as cellulose nitrate, cellulose triacetate, or the like, is dissolved in a suitable volatile solvent, such as acetone, to form a relatively thin solution, a suitable proportion being six parts of the cellulose compound to one hundred parts of the solvent. A plasticing agent such as triphenyl phosphate, triacetone, camphor or the like, is also incorporated in the solution, the proportion used being about one-half the proportion of the cellulose compound. To increase the flexibility of the material, a small proportion of castor oil, say one-fourth to one-half parts per one-hundred parts of acetone, may also be included. For treating white fabric, a suitable white pigment is likewise incorporated in the treating material, zinc white and lithopone having been found suitable for this purpose. Either of these pigments may be employed, or mixtures thereof may be used in order to get a tint most closely matching the particular tint of the fabric being treated. A minute amount of ultramarine blue or other suitable bluing material may likewise be incorporated to get the desired color tone. A small proportion of barium sulphate is added, this material effectively preventing gloss upon the surface of the treated article. The proportion of barium sulphate may likewise be varied in accordance with the particular surface effect desired. From one-quarter to one per cent. or even more may be used, one-half per cent. being found suitable in the treatment of articles such as white collars.

It is readily apparent that the pigment employed may be varied in accordance with the tone or color of the article to be treated. It is to be noted that the term "pigment" as used herein, does not include the barium sulphate.

The following treating liquid has been found suitable for use in the treatment of white collars, rendering them water-proof, proof against perspiration and not producing a gloss upon the surface of the treated collar.

Acetone 100 parts, cellulose triacetate 6 parts, plasticing agent, such as triphenyl phosphate or triacetone, 3 parts, castor oil one-fourth to one-half part, pigment, preferably a mixture of zinc white and lithopone in equal proportions, 3 parts and barium sulphate, one-half part. The matt effect of the finish may be increased by increasing the amount of barium sulphate. If required, a minute proportion of ultramarine blue may be included. During the preparation of the liquid, a small proportion of the acetone, say 5 to 8 parts, may volatilize.

The treatment of the fabric with the material, in addition to its waterproofing and grease proofing effects, likewise has a stiffening action, and may be hence employed on collars of soft materials to stiffen them as well as for the other effects produced.

Although the present invention has been described in connection with the specific details of an example embodying it, it is not intended that these details shall be regarded as limitations upon the scope of the invention, except in so far as included in the accompanying claims.

I claim:

1. A liquid for impregnating articles of fabric materials comprising cellulose triacetate, a solvent therefor, a plasticing agent, a pigment and one-fourth to one part of barium sulphate per one-hundred parts of solvent.

2. A liquid for treating articles of fabric materials comprising acetone 100 parts, cellulose triacetate 6 parts, a plasticing agent 3 parts, castor oil one-fourth to one-half part, zinc white and lithopone, 3 parts, and barium sulphate one-half part.

ALBERT NEUSELLA.